United States Patent
Lenz et al.

(10) Patent No.: US 7,413,266 B2
(45) Date of Patent: Aug. 19, 2008

(54) METHOD FOR CONTROLLING THE BRAKE SYSTEM OF A VEHICLE TRAIN

(75) Inventors: Thomas Lenz, Lehrte (DE); Benno Meyer, Lauenau (DE); Gerhard Ruhnau, Neustadt (DE)

(73) Assignee: WABCO GmbH & Co. OHG, Hannover (DE)

( * ) Notice: Subject to any disclaimer, the term of this patent is extended or adjusted under 35 U.S.C. 154(b) by 504 days.

(21) Appl. No.: 10/683,453

(22) Filed: Oct. 10, 2003

(65) Prior Publication Data

US 2004/0119334 A1    Jun. 24, 2004

(30) Foreign Application Priority Data

Oct. 12, 2002    (DE)    ............... 102 47 722

(51) Int. Cl.
*B60T 8/60* (2006.01)
(52) U.S. Cl. .......................... 303/150; 303/7
(58) Field of Classification Search ............. 303/7, 303/147, 150; 701/70, 72
See application file for complete search history.

(56) References Cited

U.S. PATENT DOCUMENTS

| | | | | |
|---|---|---|---|---|
| 3,967,862 A | * | 7/1976 | Hunter et al. | 303/150 |
| 4,036,536 A | * | 7/1977 | Quon | 303/126 |
| 5,411,322 A | * | 5/1995 | Breen | 303/7 |
| 5,421,644 A | * | 6/1995 | Prescott et al. | 303/123 |
| 6,176,555 B1 | * | 1/2001 | Semsey | 303/7 |
| 6,498,977 B2 | | 12/2002 | Wetzel et al. | |
| 2005/0011693 A1 | | 1/2005 | Horn et al. | |

FOREIGN PATENT DOCUMENTS

| | | |
|---|---|---|
| DE | 199 63 747 A1 | 7/2001 |
| DE | 199 64 164 A1 | 7/2001 |
| DE | 101 28 692 A1 | 12/2001 |
| JP | 2001058563 A * | 3/2001 |
| WO | WO 03/022650 A1 | 3/2003 |

OTHER PUBLICATIONS

Attachment To The Notice of Opposition to European Patent 1 407 948 B1.
(Confidential) Technical Customer Information, "Electronic Stability Program (ESP) for Commercial Vehicles", Y 486 K00 028, Knorr-Bremse Systeme für NutzfahrzeugeGmbH, May 27, 2002.

(Continued)

*Primary Examiner*—Xuan Lan Nguyen
(74) *Attorney, Agent, or Firm*—Kramer Levin Naftalis & Frankel LLP

(57) ABSTRACT

An improved method and associated system for controlling the brake system of a vehicle train including a tractor vehicle and a trailer vehicle, wherein a control device disposed in the tractor vehicle is adapted to initiate automatic braking of the trailer vehicle, and wherein the conditions of the driving roadway, especially the coefficient of friction, are taken into account in braking of the trailer vehicle. The intensity of braking of the trailer vehicle is reduced by the control device when a coefficient of friction smaller than a predetermined minimum value is detected between the vehicle train or parts thereof and the driving roadway. One application of the invention is in load trains equipped with means for preventing rollover or overturning.

16 Claims, 2 Drawing Sheets

OTHER PUBLICATIONS

Delivery Note for 126 Electronic Control Units of Type 20428758 delivered by Knorr-Bremse Systeme für NutzfahrzeufeGmbH to Volvo Lastvagnar AB Umeverken, Dec. 21, 2001.

VTC (Volvo Truck Corporation) Part Numbers and Changes Within EBS 2.3, Oct. 2002.

* cited by examiner

METHOD FOR CONTROLLING THE BRAKE SYSTEM OF A VEHICLE TRAIN

BACKGROUND OF THE INVENTION

The present invention is directed generally to a method and system for controlling the brake system of a tractor and trailer vehicle combination.

DE 101 28 692 A1 describes a method of the general type under consideration used to prevent a vehicle train comprising a tractor vehicle and a trailer vehicle (referred to therein as a "load train") from overturning or rolling over while negotiating a curve. For this purpose, the vehicle train is braked by automatic actuation of the brake system when a specified, relatively high lateral acceleration is reached—the tractor vehicle and trailer vehicle each being braked. If the vehicle train is traveling on a driving roadway with relatively low coefficient of friction, wheel lock can occur, potentially leading to an undesired reduction of the cornering force of the wheels and, in turn, to swerving of the vehicle train. If the vehicle train is equipped with an anti-lock brake system (ABS), the wheel-lock protection function of the ABS prevents wheel lock and thus maintains the cornering force.

Commonly, a tractor vehicle equipped with an ABS is coupled with a trailer vehicle that lacks an ABS. In such case, wheel lock can occur during automatic braking of the trailer vehicle, potentially leading to an unsafe driving condition. In the method described in DE 101 28 692 A1, the brake system of the trailer vehicle is generally actuated intermittently in order to avoid such potentially unsafe driving conditions. However, this method makes no allowance for the real external conditions, such as the coefficient of friction of the driving roadway at that particular time. As a result, the physically possible braking effect of the trailer vehicle is not fully realized, especially on a driving roadway with relatively high coefficient of friction, and the measures to prevent the vehicle train from overturning cannot be applied optimally.

It is desired to provide an improved method and system for controlling the brake system of a vehicle train in which the conditions of the driving roadway are taken into account in braking of the trailer vehicle.

SUMMARY OF THE INVENTION

Generally speaking, in accordance with the present invention, a method and system for controlling the brake system of a vehicle train are provided which improve over prior art methods and systems.

In a preferred embodiment of the method and system for controlling the brake system of a vehicle train according to the present invention, a coefficient of friction is detected between the roadway and the vehicle train. If the coefficient of friction is smaller than a predetermined minimum value, the intensity of braking of the trailer vehicle is reduced utilizing a control device in the tractor vehicle which is adapted to initiate automatic braking of the trailer vehicle.

The intensity of braking of the trailer vehicle can be defined as a function of the mass of the vehicle train. Also, reduction of the intensity of braking of the trailer vehicle can be effected by output of a signal-pulse train to a trailer control valve which controls braking of the trailer vehicle, the signal-pulse train being selected from a predetermined set of signal-pulse trains.

In one embodiment of the method and system according to the present invention, the step of determining whether the coefficient of friction is smaller than a predetermined minimum value includes determining if a wheel-lock protection function in the tractor vehicle is responsive.

In another embodiment, the step of determining a response of a wheel-lock protection function in the tractor vehicle includes determining a response of the wheel-lock protection function on an outer wheel of the rear axle of the tractor vehicle relative to the curve of the roadway.

In another embodiment, the step of determining whether the coefficient of friction is smaller than the predetermined minimum value includes measuring the total deceleration of the vehicle train, comparing the measured total deceleration with an expected total deceleration based on actuation of the brake system, and determining if the measured total deceleration is smaller than the expected value.

In yet another embodiment, signals of a data interface between the tractor vehicle and the trailer vehicle are analyzed utilizing the control device. A determination if the wheel-lock protection function in the trailer vehicle is operative is made based on the analysis of the signals, and reduction of the intensity of braking of the trailer vehicle is prevented if the wheel-lock protection function in the trailer is operative.

The present invention has the advantage that it can be provided simply and effectively in the control device for an ABS, or, in other words, in the electronic control unit (ECU) thereof. For this purpose, the program algorithm stored in the ECU is expanded. Further complexity, especially in the form of equipment such as sensors or actuators, is not required. The invention can therefore be implemented very inexpensively.

Accordingly, it is an object of the present invention to provide an improved method and system for controlling the brake system of a vehicle train in which braking of the trailer vehicle takes place with improved exploitation of the conditions of the driving roadway.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which.

DETAILED DESCRIPTION OF THE PREFERRED EMBODIMENTS

Figure 1:
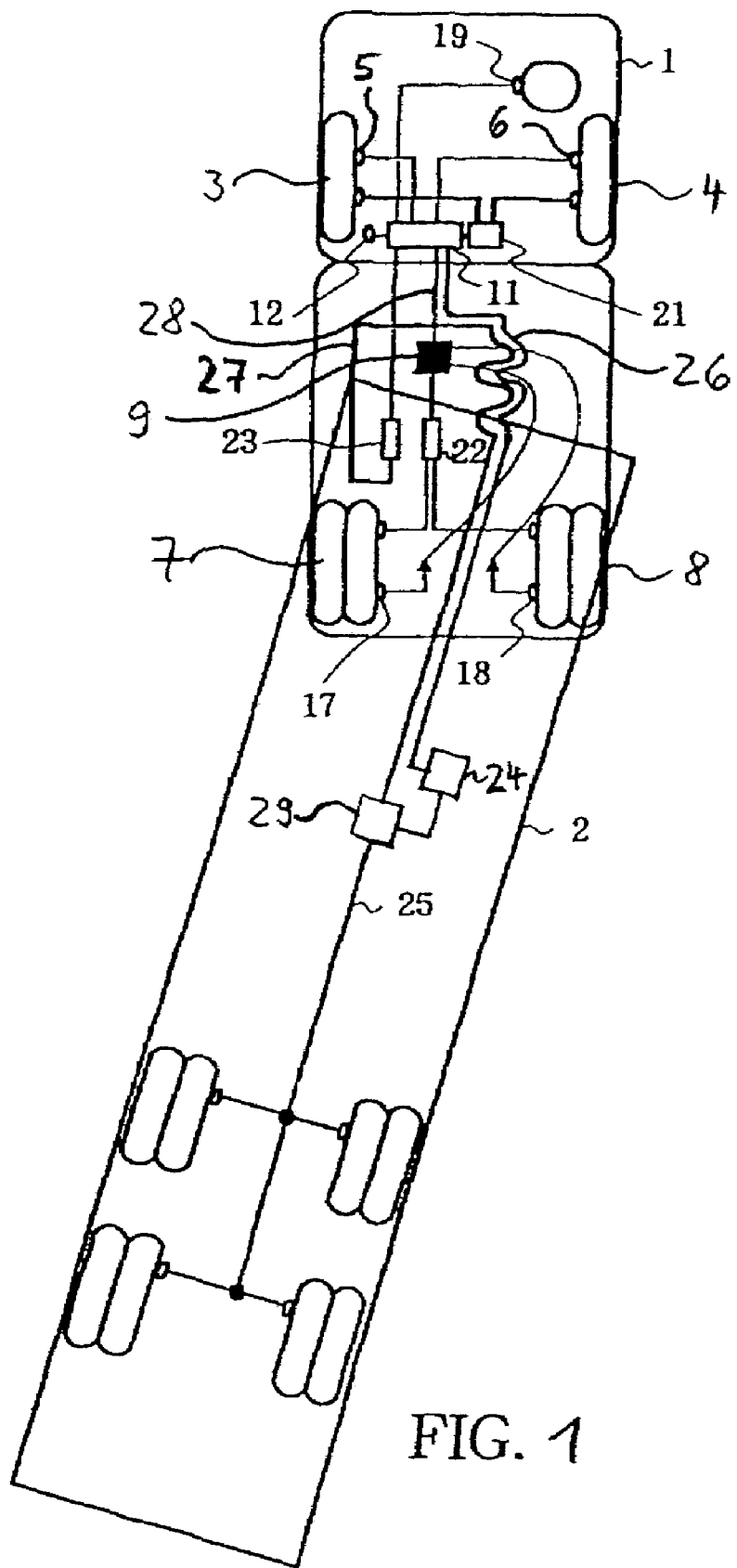
FIG. 1 is a bottom view of a vehicle train according to a preferred embodiment of the present invention.

Referring now to the drawing figures where like reference numbers are used for corresponding elements, FIG. 1 shows a vehicle train including a tractor vehicle (1) to which a trailer vehicle (2) is coupled. The tractor vehicle (1) is provided with a steerable front axle, on which wheels (3, 4) are mounted, and with a rear axle, on which wheels (7, 8) are mounted. Braking force can be applied to wheels (3, 4, 7, 8) via wheel brakes allocated to the wheels. Hereinafter, it will be assumed that the vehicle is equipped with an electrically controlled pressurized-fluid brake system, such as an ABS or an electrically controlled brake system (EBS). It should be understood, however, that the invention can also be used advantageously for brake systems of other types, such as systems wherein the brakes can be actuated by purely electromechanical means.

Tractor vehicle (1) is equipped with a control device (11) which is used for control of various brake functions on the front axle of the tractor vehicle. As an example, control device (11) can be designed as an electronic ABS or EBS control unit. For this purpose, control device (11) is connected via an electric circuit to a valve device (21) by means of which brake pressure can be injected into the wheel brakes of wheels (3, 4). For control of the wheel brakes of wheels (7, 8) mounted on the rear axle, there is provided a control module (9). Control module (9) is connected via an electric circuit to a further valve device (22), via which brake pressure can be injected into the wheel brakes of wheels (7, 8). For data exchange, control module (9) is connected via a data circuit (28) to control device (11).

Via electric circuits, control module (9) receives speed signals from speed sensors (17, 18) which are disposed on wheels (7, 8) and by means of which the speeds of rear wheels (7, 8) can be determined. Control device (11) is electrically connected to speed sensors (5, 6), by means of which the speeds of front wheels (3, 4) can be determined. Via data circuit (28), control device (11) receives, from further control device (9), signals which represent the speeds of rear wheels (7, 8) of tractor vehicle (1).

Furthermore, a steering-angle sensor (19) as well as a lateral-acceleration sensor (12) can be electrically connected to control device (11). By using the signals mentioned in the foregoing, especially for lateral acceleration, wheel speeds and steering angle, control device (11) is capable of detecting a possible rollover danger of vehicle train (1, 2).

Trailer vehicle (2) is also provided with a pressurized-fluid brake system, which can be actuated via a brake line (25). A trailer control valve device (23) for controlling the braking of trailer vehicle (2) is provided in tractor vehicle (1). By trailer control valve (23), brake pressure can be admitted to brake-pressure line (25) via a brake-pressure line (27). Trailer control valve (23) is electrically connected to control device (11). By means of trailer control valve (23), control device (11) is able to control the brake pressure in trailer vehicle (2). Preferably, trailer control valve (23) is of the "on/off" type, meaning that the brake pressure can only be either injected or vented once again. For cost reasons, a function or operating position corresponding to holding of the brake pressure is not provided.

Also provided in trailer vehicle (2) is a device (24), such as, for example, an ABS, which provides a wheel-lock protection function for trailer vehicle (2). By means of a valve device (29), ABS (24) is capable of modulating the brake pressure fed via brake-pressure line (25) to trailer vehicle (2), or, in other words, of reducing the brake pressure in the case of a danger of wheel lock. ABS (24) is connected via a data interface (26) as well as electric circuits to control device (11) in tractor vehicle (1). Via data interface (26), ABS (24) outputs a signal to control device (11), which indicates whether the wheel-lock protection function in trailer vehicle (2) is operative. Data interface (26) can be designed, for example, as a power line carrier (PLC) interface.

Control device (11) executes a series of control algorithms, such as a wheel-lock protection function for the front axle of tractor vehicle (1), electronic brake-force distribution between the front and rear axles of the tractor vehicle, optimization of brake-lining wear between the front and rear axles of the tractor vehicle, as well as a method for preventing rollover of vehicle train (1, 2).

Figure 2:
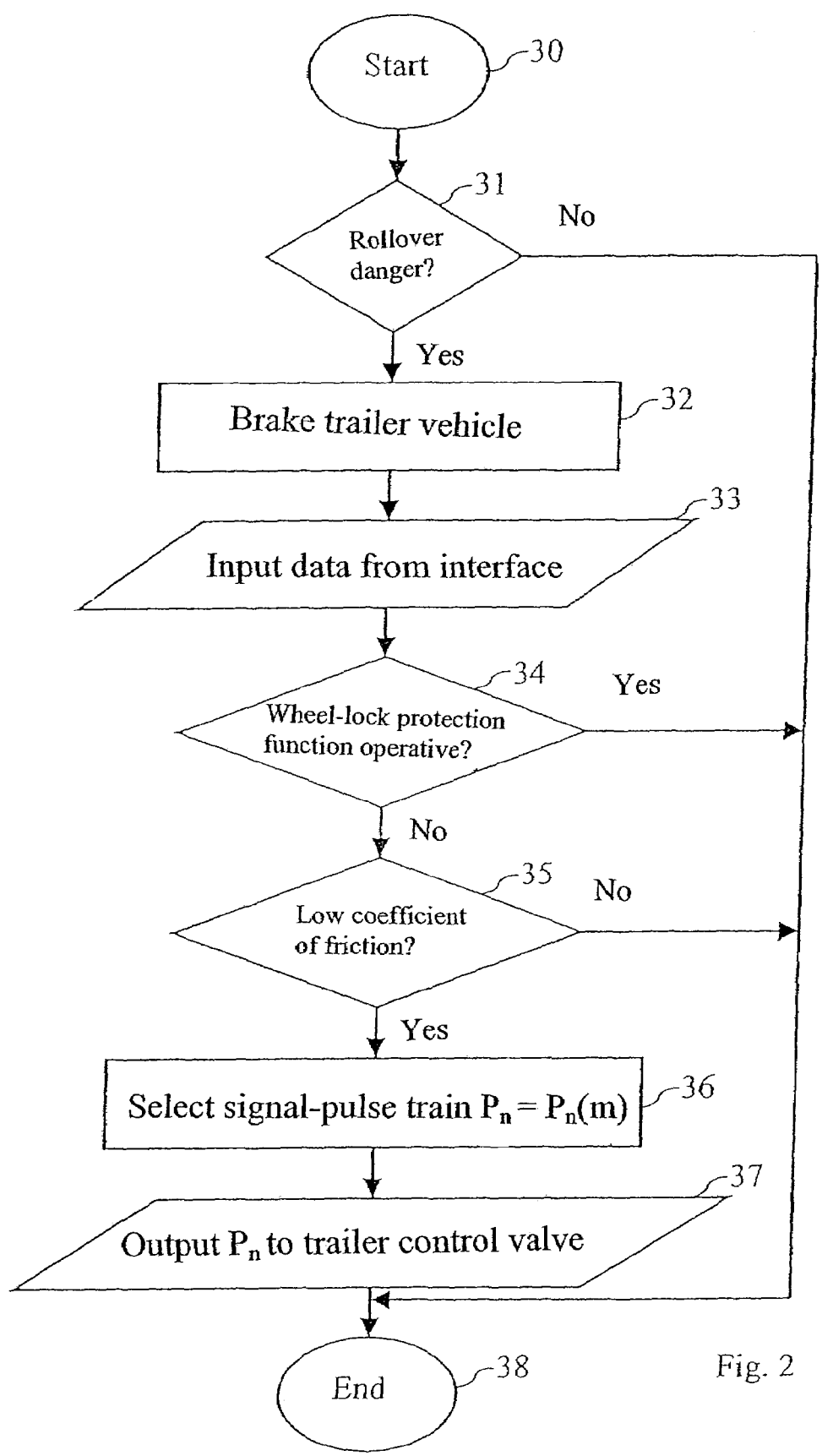
FIG. 2 is a flow chart showing the process flow of a method for controlling the brake system of a vehicle train according to a preferred embodiment of the present invention.

Referring to FIG. 2, there will now be explained that aspect of a method for rollover prevention which is designed to prevent unsafe driving conditions of vehicle train (1, 2) due to wheel lock in trailer vehicle (2).

The process according to FIG. 2 begins with block (30). In a subsequent decision block (31), predefined algorithms examine whether a rollover danger exists. For this purpose, the lateral acceleration measured by lateral-acceleration sensor (12), for example, is examined to determine whether it exceeds a maximum permissible value. A result exceeding the maximum permissible value means that a rollover danger is imminent. Depending on the sensors with which the vehicle is equipped, the lateral acceleration can also be calculated from the speeds of revolution of wheels (3, 4, 7, 8), preferably of front wheels (3, 4), or from the signal of steering-angle sensor (19) in combination with the ground speed of the vehicle. In practice, in the interests of safety, lateral-acceleration signals are determined from the signals of a plurality of sensors, if provided, and are checked for mutual plausibility. It should be understood that the signal indicating rollover danger can also be determined in other suitable ways such as, for example, from the wheel loads, which can be estimated from the pressure levels present in air-spring bellows.

If a rollover danger is not determined in decision block (31), the program moves directly to block (38), whereupon the process ends. Otherwise, the program steps to block (32) and the trailer vehicle (2) is braked by actuation of trailer control valve (23).

Thereupon, a data-transfer block (33) is executed. Therein, data are read in from interface (26), especially the information communicated by ABS (24) to indicate whether the wheel-lock protection function is operative.

At decision block (34), the program examines whether the wheel-lock protection function in trailer vehicle (2) is operative. If this condition is met, the program moves to block (38), whereupon the process ends. Further action to prevent wheel lock in the trailer vehicle are not required in this case.

If it is determined at decision block (34) that the wheel-lock protection function in trailer vehicle (2) is not operative, or if the trailer vehicle is not even equipped with an ABS, the program steps to decision block (35). Therein, the program examines whether a coefficient of friction smaller than a given minimum value exists between vehicle train (1, 2) and the driving roadway, or, in other words, between the tires of vehicle train (1, 2) and the driving roadway. This test can be performed, for example, by checking whether the wheel-lock protection function in tractor vehicle (1) responds. In a preferred embodiment, the program examines whether the wheel-lock protection function responds for the outer wheel, relative to the curve, of the rear axle of tractor vehicle (1); in the case of the left-hand curve illustrated in FIG. 1, the program therefore examines whether the anti-lock function of wheel (8) responds. In addition, inner wheels (3, 7), relative to the curve, of tractor vehicle (1) can also be checked for response of the wheel-lock protection function. Any locking tendency or corresponding skidding of these wheels (3, 7) can be used as a measure of the displacement of wheel load from the inner side, relative to the curve, of tractor vehicle (1) to the outer side relative to the curve, and thus of the rollover tendency of the tractor vehicle.

A further option for detecting a low coefficient of friction includes determining the measured total deceleration of vehicle train (1, 2) during automatic braking, and comparing it with the value expected from actuation of the brake system. If the measured total deceleration does not reach this expected value, or, in other words, is smaller, a small coefficient of friction can be inferred. Alternatively, this test can also be performed at specified wheel slip during braking initiated by the driver.

If it is determined at decision block (35) that the coefficient of friction is not small, the program moves to block (38), whereupon the process ends. Otherwise, the program steps to block (36), in which a signal-pulse train ($P_n$) for activation of trailer control valve (23) is selected from a predetermined set of signal-pulse trains ($P_n(m, a_q)$). The signal-pulse train ($P_n$) indicates the time grid in which control device (11) is supposed to turn on trailer control valve (23) and thus to brake trailer vehicle (2), or the time intervals in which braking is not supposed to take place. By appropriate distribution of the "on" and "off" times of trailer control valve (23), the brake pressure for trailer vehicle (2) can be adjusted to a desired mean value. As an example, the signal-pulse train ($P_n$) is selected as a function of the mass of vehicle train (1, 2), which is stored in control device (11) or is calculated. A further selection parameter is, for example, the lateral acceleration ($a_q$) of vehicle train (1, 2) determined by means of lateral-acceleration sensor (12). The signal-pulse train ($P_n$) to be used can be selected, for example, on the basis of the following table:

|  | $a_q > a_{q1}$ | $a_q > a_{q2}$ | $a_q > a_{q3}$ |
| --- | --- | --- | --- |
| m < 24 t | $P_{n1, 1}$ | $P_{n1, 2}$ | $P_{n1, 3}$ |
| 24 t < m < 30 t | $P_{n2, 1}$ | $P_{n2, 2}$ | $P_{n2, 3}$ |
| m > 30 t | $P_{n3, 1}$ | $P_{n3, 2}$ | $P_{n3, 3}$ |

According to the table, the mass m of vehicle train (1, 2) is divided into three groups: "lighter than 24 metric tons" (m<24 t), "between 24 and 30 metric tons" (24 t<m<30 t), and "heavier than 30 metric tons" (m>30 t). The lateral acceleration ($a_q$) is divided into three groups, namely $a_q > a_{q1}$, $a_q > a_{q2}$, and $a_q > a_{q3}$, wherein $a_{q1} < a_{q2} < a_{q3}$.

A further advantageous option for defining the signal-pulse train ($P_n$) includes using a steadily varying characteristic, such as a polygon curve, by means of which the "on" and "off" times of trailer control valve (23) are determined as a function of the measured vehicle mass. In this way, the matching of "on" and "off" times to the respective load can be further improved.

In a subsequent data-transfer block (37), the signal-pulse train ($P_n$) is output to trailer control valve (23). Thereafter, the process ends at block (38).

Accordingly, the present invention provides an improved method and system for controlling the brake system of a vehicle train in which the conditions of the driving roadway are taken into account in braking of the trailer vehicle.

It will thus be seen that the objects set forth above, among those made apparent from the preceding description, are efficiently attained, and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A method for controlling the brake system of a vehicle train, the vehicle train including a tractor vehicle and a trailer vehicle, a control device in the tractor vehicle arranged and constructed to initiate automatic braking of the trailer vehicle when a vehicle train rollover danger is presented, the method comprising the steps of detecting a coefficient of friction between the roadway on which the vehicle train travels and the vehicle train, determining whether the coefficient of friction is smaller than a predetermined minimum value when an anti-wheel-lock braking function is at least one of absent in said trailer vehicle and inoperative in said trailer vehicle, and reducing intensity of automatic braking of the trailer vehicle utilizing the control device in the tractor vehicle when the coefficient of friction is smaller than the predetermined minimum value.

2. The method according to claim 1, wherein the step of determining whether the coefficient of friction is smaller than a predetermined minimum value includes determining a response of a wheel-lock protection function in the tractor vehicle.

3. The method according to claim 2, wherein the step of determining a response of a wheel-lock protection function in the tractor vehicle includes determining a response of the wheel-lock protection function on an outer wheel of a rear axle of the tractor vehicle relative to a curve of the roadway.

4. The method according to claim 1, wherein the step of determining whether the coefficient of friction is smaller than a predetermined minimum value includes measuring total deceleration of the vehicle train, comparing the measured total deceleration with a value expected for the total deceleration on the basis of actuation of the brake system, and determining if the measured total deceleration is smaller than the expected value.

5. The method according to claim 1, wherein the intensity of braking of the trailer vehicle is defined as a function of the mass of the vehicle train.

6. A method for controlling the brake system of a vehicle train, the vehicle train including a tractor vehicle and a trailer vehicle, a control device in the tractor vehicle arranged and constructed to initiate automatic braking of the trailer vehicle, the method comprising the steps of detecting a coefficient of friction between the roadway on which the vehicle train travels and the vehicle train, determining whether the coefficient of friction is smaller than a predetermined minimum value, reducing the intensity of braking of the trailer vehicle utilizing the control device when the coefficient of friction is smaller than the predetermined minimum value, analyzing signals of a data interface between the tractor vehicle and the trailer vehicle, determining if a wheel-lock protection function in the trailer vehicle is operative based on the analysis of the signals, and preventing reduction of the intensity of braking of the trailer vehicle if the wheel-lock protection function in the trailer is operative.

7. The method according to claim 1, wherein the step of reducing the intensity of braking of the trailer vehicle is effected by output of a signal-pulse train to a device arranged and constructed to control braking of the trailer vehicle, the signal-pulse train being selected from a predetermined set of signal-pulse trains.

8. A method for controlling the braking system of a vehicle train, the vehicle train including a tractor vehicle and a trailer vehicle, a control device in the tractor vehicle arranged and constructed to automatically brake the trailer vehicle, the method comprising the steps of determining whether a vehicle train rollover condition is present, automatically braking the trailer vehicle if a rollover condition is determined, determining whether a wheel-lock protection function of the trailer vehicle is at least one of present in said trailer vehicle and operative in said trailer vehicle, determining if a coefficient of friction between the roadway on which the vehicle train travels and the vehicle train is smaller than a predetermined minimum value when said wheel-lock protection function is at least one of absent in said trailer vehicle and inoperative in said trailer vehicle, selecting a signal-pulse train for reducing intensity of automatic braking of said trailer vehicle from a predetermined set of signal-pulse trains, and outputting the selected signal-pulse train utilizing said control device to actuate a device arranged and constructed to control braking of the trailer vehicle.

9. A system for controlling the brake system of a vehicle train, the vehicle train including a tractor vehicle and a trailer vehicle, the system comprising means associated with the tractor vehicle arranged and constructed to initiate automatic braking of the trailer vehicle when a vehicle train rollover danger is presented, means for detecting a coefficient of friction between the roadway on which the vehicle train travels and the vehicle train, means for determining whether the coefficient of friction is smaller than a predetermined minimum value when an anti-wheel-lock braking function is at least one of absent in said trailer vehicle and inoperative in said trailer vehicle, and means associated with the tractor vehicle for reducing intensity of automatic braking of the trailer vehicle when the coefficient of friction is smaller than the predetermined minimum value.

10. The system according to claim 9, wherein said means for determining whether the coefficient of friction is smaller than a predetermined minimum value includes means for determining a response of a wheel-lock protection function in the tractor vehicle.

11. The system according to claim 10, wherein said step of determining a response of a wheel-lock protection function in the tractor vehicle includes determining a response of the wheel-lock protection function on an outer wheel of a rear axle of the tractor vehicle relative to a curve of the roadway.

12. The system according to claim 9, wherein said means for determining whether the coefficient of friction is smaller than a predetermined minimum value includes means for measuring total deceleration of the vehicle train, means for comparing the measured total deceleration with a value expected for the total deceleration on the basis of actuation of the brake system, and means for determining if the measured total deceleration is smaller than the expected value.

13. The system according to claim 9, wherein the intensity of braking of the trailer vehicle is defined as a function of the mass of the vehicle train.

14. A system for controlling the brake system of a vehicle train, the vehicle train including a tractor vehicle and a trailer vehicle, the system comprising means associated with the tractor vehicle arranged and constructed to initiate automatic braking of the trailer vehicle, means for detecting a coefficient of friction between the roadway on which the vehicle train travels and the vehicle train, means for determining whether the coefficient of friction is smaller than a predetermined minimum value, means for reducing the intensity of braking of the trailer vehicle when the coefficient of friction is smaller than. the predetermined minimum value, means for analyzing signals of a data interface between the tractor vehicle and the trailer vehicle, means for determining if a wheel-lock protection function in the trailer vehicle is operative based on the analysis of the signals, and means for preventing reduction of the intensity of braking of the trailer vehicle if the wheel-lock protection function in the trailer is operative.

15. The system according to claim 9, wherein the means for reducing the intensity of braking of the trailer vehicle is responsive to output of a signal-pulse train, the signal-pulse train being selected from a predetermined set of signal-pulse trains.

16. A system for controlling the brake system of a vehicle train, the vehicle train including a tractor vehicle and a trailer vehicle, the system comprising means for determining whether a vehicle train rollover condition is presented, means associated with the tractor vehicle arranged and constructed to automatically brake the trailer vehicle when a vehicle train rollover condition is determined, means for determining whether a wheel-lock protection function of the trailer vehicle is at least one of present in said trailer vehicle and operative in said trailer vehicle, means for determining if a coefficient of friction between the roadway on which the vehicle train travels and the vehicle train is smaller than a predetermined minimum value when said wheel-lock protection function is at least one of absent in said trailer vehicle and inoperative in said trailer vehicle, means for selecting a signal-pulse train from a predetermined set of signal-pulse trains for reducing intensity of automatic braking of said trailer vehicle when said coefficient of friction is smaller than said predetermined minimum value, and means responsive to the selected signal-pulse train arranged and constructed to control braking of the trailer vehicle.

* * * * *